C. B. STEVENS.
WAGON BRAKE.
APPLICATION FILED MAY 18, 1915.

1,165,295. Patented Dec. 21, 1915.

Inventor
C. B. Stevens

Witnesses

By
Attorneys

UNITED STATES PATENT OFFICE.

CHARLES B. STEVENS, OF NEW YORK, N. Y.

WAGON-BRAKE.

1,165,295.  Specification of Letters Patent.  Patented Dec. 21, 1915.

Application filed May 18, 1915. Serial No. 28,930.

*To all whom it may concern:*

Be it known that I, CHARLES B. STEVENS, a citizen of the United States, residing at New York, in the county of New York, State of New York, have invented certain new and useful Improvements in Wagon-Brakes; and I do hereby declare the following to be a full, clear, and exact description of the invention, such as will enable others skilled in the art to which it appertains to make and use the same.

This invention relates to improvements in wagon brakes.

The principal object of the invention is to provide a simple and efficient device for locking the wheels of a wagon so as to prevent a horse from running away with the wagon.

Another object is to provide a device of this character which is of simple construction and which can be readily applied to the ordinary wagon and which can be quickly and easily attached to or detached from the wheels.

Other objects and advantages will be apparent from the following description when taken in connection with the accompanying drawing.

Figure 1:
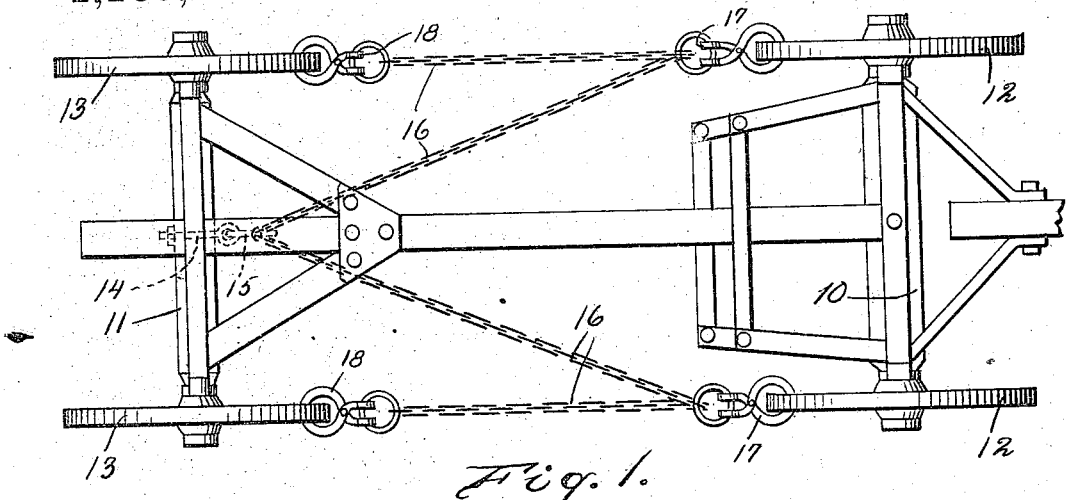
Figure 2:
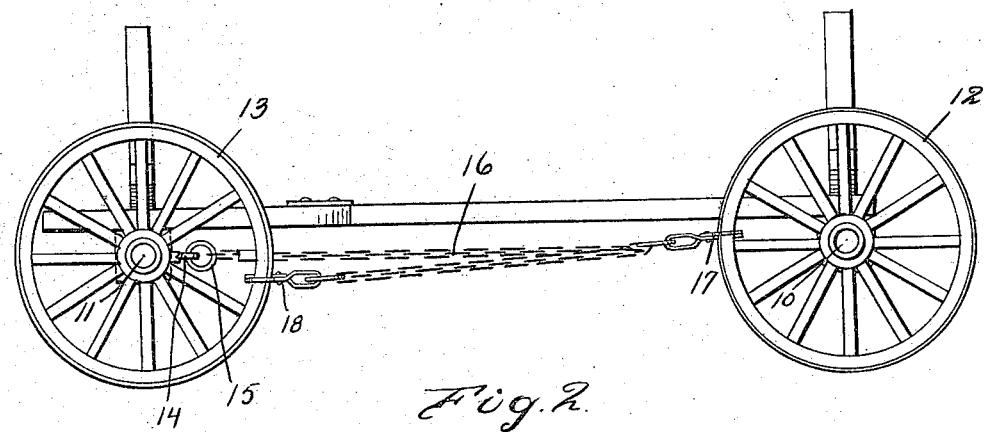
Figure 3:
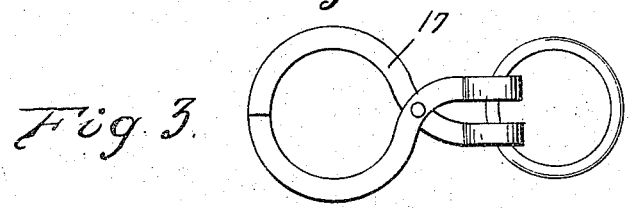
Figure 4:
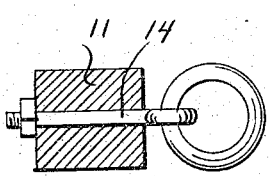

In the drawing: Figure 1 is a plan view of the running gear of a vehicle showing my brake in applied position, Fig. 2 is a side elevation, Fig. 3 is an enlarged elevation of one of the wheel clamping devices, and Fig. 4, is a detail sectional view through the rear axle showing the ring attaching means.

Referring particularly to the accompanying drawing, 10 and 11 represent respectively the front and rear axles of a wagon, the former having the wheels 12 and the latter the wheels 13. Secured to the center of the rear axle by means of a suitable bolt 14 is a ring 15 which has secured thereto a pair of chains 16. Detachably clamped around the tire and rim of each of the front wheels is a separable clamping ring 17 while a somewhat similar ring 18 is attached to each of the rear wheels 13. The chains 16 extend forwardly and through the rings 17 from whence they extend rearwardly and are attached to the rings 18.

When the device is applied in the position shown in Fig. 1, the wheels are held against rotating, and thus prevent a horse running away with the vehicle, as the wheels would drag on the ground and form a brake.

It will thus be seen that the device is of extremely simple construction and that it can be applied to any vehicle without modifications thereto.

What is claimed is:

A wagon brake comprising a member secured to the rear axle of the wagon, detachable clamping members engaged with the front and rear wheels of the vehicle, and chains secured to the axle-carried member and extending forwardly through the clamping members of the front wheels and thence rearwardly where they are secured to the clamping bars of the rear wheels.

In testimony whereof, I affix my signature, in the presence of two witnesses.

CHARLES B. STEVENS.

Witnesses:
 J. G. WEISS,
 R. J. ADGATE.

Copies of this patent may be obtained for five cents each, by addressing the "Commissioner of Patents, Washington, D. C."